Patented Apr. 2, 1935

1,996,101

UNITED STATES PATENT OFFICE 1,996,101

MANUFACTURE OF OXYGENATED ORGANIC COMPOUNDS

Henry Dreyfus, London, England

No Drawing. Application July 21, 1930, Serial No. 469,648. In Great Britain July 24, 1929

14 Claims. (Cl. 260—156)

This invention relates to the manufacture of oxygenated organic compounds from oxides of carbon and hydrogen, or alternatively from compounds synthesized therefrom, e. g. methyl alcohol, mixed or not with oxides of carbon and/or hydrogen.

Iron and cobalt are well known as hydrogenating catalysts, but in the hydrogenation of oxides or carbon it has been considered that the presence of these metals or compounds containing them has been productive of hydrocarbons such as methane and deleterious to the production of oxygenated organic compounds.

I have now found that cobalt and iron may be present in the catalyst or catalyst mixture in the form of a salt in which the iron or cobalt is present in the acid radicle, and that such use of iron and cobalt tends to direct the reaction towards the production of oxygenated compounds, and particularly oxygenated compounds of a higher order than methyl alcohol, for instance compounds containing two or three carbon atoms, such as acetaldehyde, ethyl alcohol, propyl alcohol and acetone.

According to the present invention therefore oxygenated organic compounds are produced by the catalytic hydrogenation of oxides of carbon in presence of iron and cobalt in the form of compounds containing these metals in the acid radicle. For example they may be present in the form of ferrites, ferrates, cobaltites and cobaltates, and particularly in the form of such salts of the alkali and alkaline earth metals, for example sodium, potassium, barium, calcium and magnesium, and of aluminium.

The proportion of basic radicle to acid radicle may be varied and may produce corresponding variations in the products or in the content of the products in particular compounds. An excess of the basic radicle, and particularly of an alkali or alkaline earth metal, tends to increase the proportion of higher oxygenated organic compounds produced. The excess may be present in a combined state, for example as a basic salt, or may be present merely in admixture with the salt used. There may, for example, be one equivalent of basic radicle to two equivalents of iron or cobalt acid radicle, but better results are obtainable by using equimolecular proportions or by using the basic radicle in a proportion of 1½ or 2 or more equivalents to one equivalent of iron or cobalt acid.

The said metallate catalysts may be employed in association with other catalysts. For example catalyst mixtures containing the said metallate catalysts in admixture or in association with zinc, magnesium, calcium, aluminium, chromium, molybdenum, vanadium, manganese, tungsten or uranium, or with two or more of these metals, for example with zinc and vanadium; with zinc and molybdenum; with zinc and magnesium, calcium or aluminium; with chromium and vanadium; with chromium and manganese; with chromium and molybdenum; or with chromium, manganese or molybdenum, and magnesium, calcium or aluminium. The other metals may be present in the metallic state or in the form of oxides or other compounds.

Any or all of the above catalytic mixtures, or the said metallate catalysts or in admixture with each other, may be employed according to the present invention in conjunction with copper, the presence of the copper, even in small proportions, exercising a favourable influence upon the reaction. Alternatively or in addition, as hereinafter referred to, the reaction may be carried out in copper vessels or in copper lined vessels.

Reacting gases of varying composition may be employed for the purpose of the present invention, for example reacting gases containing two volumes of carbon monoxide or dioxide to one volume of hydrogen, or equal volumes of carbon monoxide or dioxide and of hydrogen, or one volume of carbon monoxide or dioxide to two volumes of hydrogen. Mixtures containing intermediate proportions of carbon monoxide or dioxide and hydrogen may be employed, or mixtures containing the reaction gases in proportions outside the limits indicated above. Mixtures of carbon monoxide and dioxide may of course be employed.

In the present invention it is not of course necessary to utilize pure reacting gases. Mixtures containing the desired reacting gases may be employed, for example coke oven gas, producer gas, water gas and the like. The proportions of reacting gases in such industrial gases may be adjusted if desired by suitable additions. The reacting gases may contain inert gases, such as nitrogen, or they may contain hydrocarbons for example methane or other paraffins. The methane or other hydrocarbons may be used in addition to hydrogen and an oxide of carbon, or may wholly or in part replace the hydrogen.

The reaction according to the present invention may be conducted at any suitable temperature for the synthesis of organic compounds, for example temperatures ranging from 200° to 250° C. to 400° to 500° or even 600° C. or more, but preferably temperatures are used between 250° and 400° C., and particularly temperatures of 250° to 300° to 350° C. The reaction is preferably carried out under pressure, for example pressures of 50, 100, 200, 300 or 500 atmospheres or more.

I have further found that the catalysts or catalyst mixtures of the present invention may be employed for the production of further oxygenated organic compounds from compounds, e. g. methyl or ethyl alcohol or other alcohols, obtainable from oxides of carbon and hydrogen. The methyl acohol or other compounds indicated may be used alone or in conjunction with carbon monoxide, carbon dioxide and/or hydrogen. In this modification of the invention methyl alcohol, for example, may be converted into compounds of a higher order, for example into ethyl alcohol, acetaldehyde, acetic acid etc. The vapors of the methyl alcohol or other compounds may be passed with or without carbon monoxide or dioxide and with or without hydrogen over the metallate catalysts or mixtures containing the same referred to above contained in a heated reaction vessel. The carbon monoxide or dioxide and/or hydrogen, if used, may be mixed with methyl alcohol vapor in any desired manner. For example such a mixture may be prepared by bubbling the gases through a heated vessel containing methyl alcohol, or alternatively the methyl alcohol may be sprayed into a current of the gas. The methyl alcohol or other compound may be prepared in a preliminary operation continuously with its use according to the present invention for the production of higher oxygenated organic compounds. Mixtures of carbon monoxide or carbon dioxide and hydrogen or gases containing such mixtures may be passed through a reaction chamber containing zinc oxide or basic zinc chromate or other catalysts or catalyst mixtures capable of producing methyl alcohol, and the resulting gas or vapors passed directly over the catalysts or catalyst mixtures of the present invention. Instead of using methyl alcohol or other compound obtainable from carbon monoxide or dioxide and hydrogen, compounds capable of yielding the methyl alcohol etc. may be used, for example methyl formate, methyl acetate or dimethyl ether.

The reactions according to the present invention may be carried out in any suitable reaction chambers. As referred to above, the use of copper chambers or copper lined chambers present advantages, but steel chambers, and particularly steeel containing molybdenum, tungsten, manganese, cobalt, nickel or the like may also be used.

The following examples serve to illustrate convenient forms of execution of the invention, it being understood that they are given only by way of illustration and are in no way limitative.

*Example 1*

Water gas containing about 30% carbon monoxide and 65% hydrogen is passed under a pressure between 100 and 200 atmospheres in contact with a catalyst composed of one or more of the following substances:—

Barium ferrate
Barium, calcium or sodium perferrate
Sodium, magnesium or potassium ferrite, the catalyst being heated to a temperature between 250° and 350° C. There results a copious yield of ethanol and higher aliphatic alcohols, together with aliphatic acids and aldehydes.

*Example 2*

Methanol or a mixture of methanol and carbon monoxide, carbon dioxide or hydrogen is passed under a pressure between 150 and 250 atmospheres in contact with the catalyst referred to in Example 1 heated to a temperature between 250° and 400° C. There results a copious yield of ethanol and higher aliphatic alcohols. In the case where methanol is employed alone or in conjunction with carbon monoxide or carbon dioxide (and particularly in the case of carbon dioxide), the product contains compounds of a higher degree of oxidation including acetic acid, acetaldehyde, methyl acetate and higher acids, aldehydes and esters. In the case where methanol is employed in conjunction with hydrogen the compounds of higher degree of oxidation are substantially absent from the product.

What I claim and desire to secure by Letters Patent is:—

1. In the process for the manufacture of oxygenated organic compounds by effecting the reaction between any two substances selected from the group which consists of oxides of carbon, hydrogen and substances produced by the catalytic hydrogenation of oxides of carbon, the improvement of effecting the reaction in the presence of a substance selected from the group which consists of ferrites, ferrates, cobaltites and cobaltates.

2. In the process for the manufacture of oxygenated organic compounds by effecting the reaction between any two substances, selected from the group which consists of oxides of carbon, hydrogen and substances produced by the catalytic hydrogenation of oxides of carbon, the improvement of effecting the reaction in the presence of a substance selected from the group which consists of ferrites, ferrates, cobaltites and cobaltates of alkaline earth metals.

3. In the process for the manufacture of oxygenated organic compounds by effecting the reaction between any two substances selected from the group which consists of oxides of carbon, hydrogen and substances produced by the catalytic hydrogenation of oxides of carbon, the improvement of effecting the reaction in the presence of a ferrate.

4. In the process for the manufacture of oxygenated organic compounds by effecting the reaction between any two substances selected from the group which consists of oxides of carbon, hydrogen and substances produced by the catalytic hydrogenation of oxides of carbon, the improvement of effecting the reaction in the presence of a ferrate of an alkaline earth metal.

5. Process for the synthesis of oxygenated organic compounds, which comprises subjecting a mixture of carbon monoxide and hydrogen to the action of elevated temperatures and pressures in presence of a catalyst selected from the group which consists of ferrites, ferrates, cobaltites and cobaltates.

6. Process for the synthesis of oxygenated organic compounds, which comprises subjecting a mixture of carbon monoxide and hydrogen to the action of elevated temperatures and pressures in presence of a catalyst selected from the group which consists of ferrites, ferrates, cobaltites and cobaltates of the alkaline earth metals.

7. Process for the synthesis of oxygenated organic compounds, which comprises subjecting a mixture of carbon monoxide and hydrogen to the action of elevated temperatures and pressures in presence of a ferrate.

8. Process for the synthesis of oxygenated organic compounds, which comprises subjecting a mixture of carbon monoxide and hydrogen to the action of elevated temperatures and pressures in presence of a ferrate of an alkaline earth metal.

9. Process for the synthesis of oxygenated organic compounds, which comprises subjecting a mixture of carbon monoxide and hydrogen to a temperature between 250° and 400° C. and to a pressure of at least 50 atmospheres in presence of a ferrate of an alkaline earth metal.

10. Process for the synthesis of oxygenated organic compounds, which comprises subjecting an oxygenated organic compound of lower molecular weight, produced by the catalytic hydrogenation of oxides of carbon, to reaction with carbon monoxide at elevated temperatures and at a pressure higher than atmospheric in the presence of a catalyst selected from the group which consists of ferrites, ferrates, cobaltites, and cobaltates.

11. Process for the synthesis of oxygenated organic compounds, which comprises subjecting an oxygenated organic compound of lower molecular weight, produced by the catalytic hydrogenation of oxides of carbon, to reaction with carbon monoxide at a temperature between 250 and 400° C. and at a pressure of at least 50 atmospheres in presence of a catalyst selected from the group which consists of ferrites, ferrates, cobaltites and cobaltates.

12. Process for the synthesis of oxygenated organic compounds from methanol, which comprises subjecting methanol in admixture with carbon monoxide to elevated temperatures and pressures in presence of a catalyst selected from the group which consists of ferrites, ferrates, cobaltites and cobaltates.

13. Process for the synthesis of oxygenated organic compounds from methanol, which comprises subjecting methanol in admixture with carbon monoxide to a temperature between 250 and 400° C. and to a pressure between 150 and 250 atmospheres in presence of a catalyst selected from the group which consists of ferrites, ferrates, cobaltites and cobaltates.

14. Process for the synthesis of oxygenated organic compounds from methanol, which comprises subjecting methanol in admixture with carbon monoxide to a temperature between 150° and 400° C. and to a pressure between 150 and 250 atmospheres in presence of a ferrate of an alkaline earth metal.

HENRY DREYFUS.